Figure 1:
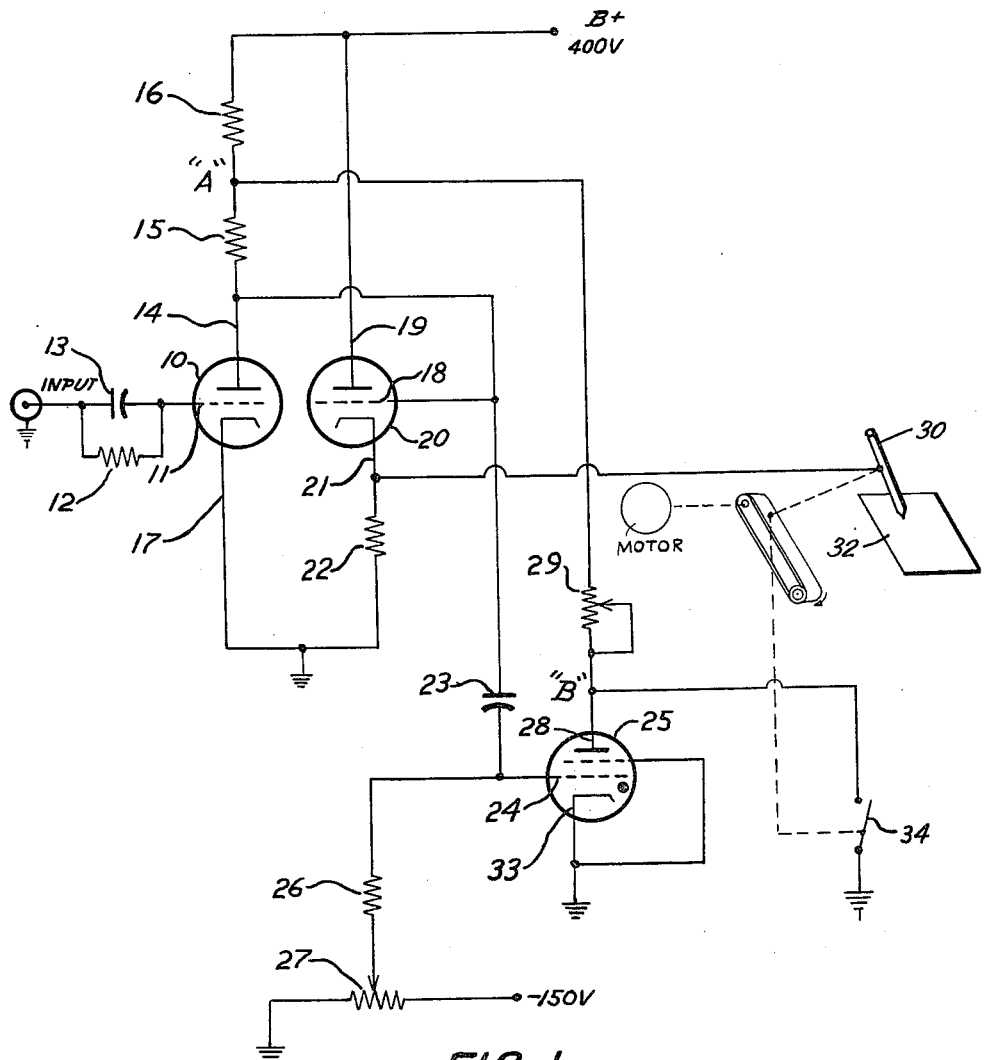

Jan. 8, 1963

J. N. BEEBE 3,072,882

ECHO RANGER WITH BOTTOM SIGNAL
AMPLITUDE COMPRESSOR

Filed Sept. 4, 1958

INVENTOR
JOHN N. BEEBE
BY *V. Vincent Harsh*
ATTORNEY

United States Patent Office 3,072,882
Patented Jan. 8, 1963

3,072,882
ECHO RANGER WITH BOTTOM SIGNAL
AMPLITUDE COMPRESSOR
John N. Beebe, Dedham, Mass., assignor to Raytheon
Company, a corporation of Delaware
Filed Sept. 4, 1958, Ser. No. 759,084
4 Claims. (Cl. 340—3)

This invention relates in general to echo ranging systems and more particularly to an underwater sonic ranging system useful for searching a body of water beneath the vessel carrying the system and for indicating the results of the search on a display apparatus.

One of the important uses for underwater sound equipment in the commercial field is the location of fish or objects on or near the bottom of a body of water. Sonic devices of the well-known depth sounder type have been used for this purpose with good results, however, the present invention relates to a method and means for improving the resolution of fish echoes returned from a location close to the sea bottom by echo sounding apparatus.

In addition to the foregoing specific application, the present invention has broad utility in various echo ranging apparatus of both radar and sonar types in producing improved resolution between wanted and unwanted echo-signals.

In the prior art underwater sound ranging system, and particularly in the art relating to aircraft warning and tracking radar equipment, several methods and circuits have been developed to aid in distinguishing a particular returned echo-signal. Receiver blanking of echo-signals returned from a particular target range or area, so-called sensitivity time control circuits, and narrow tracking gates have been used to improve the resolution of echo ranging systems, but such measures are not directly applicable in the somewhat analogous or related equipment as used to locate fish in the sea.

It is accordingly an object of the present invention to provide a method and apparatus for improving the resolution of underwater sounding equipment.

A further object of the present invention is to provide means for distinguishing the echo-signal returns from fish when such fish are located near the sea bottom, and normally the fish echo returns are weaker than those from the sea bottom.

A more specific object of this invention is to provide a signal amplitude control circuit for producing a readily discernible echo-signal trace on visual observation and recording apparatus as used with echo ranging equipment.

A specific object of the present invention is to provide an improved signal amplitude compressor which may be utilized with a recording type fish finder.

Figure 2:
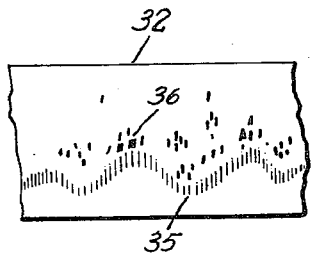

The foregoing and other objects, features, and advantages of the present invention will be best understood from the following description of a circuit embodying a preferred form of the invention particularly applicable to the location of fish near the sea bottom, reference being had to the accompanying drawing wherein:

FIG. 1 is a schematic diagram of the electrical circuit which may be used in practicing the invention; and FIG. 2 shows a portion of a record medium displaying echo signals received by an underwater sound equipment utilizing the invention.

A sonic underwater echo ranging system includes a transducer mounted to send signal energy downwardly from a vessel toward the bottom of the water body. Reflected signal energy from the bottom and from intervening objects in the water such as fish is received by the transducer, amplified, detected and applied to a display or indicator system. The indicator may comprise a record medium and a record producing element, such as a stylus, drawn across the record medium. The detected echo signal energy is applied through the stylus to the record medium to produce marks thereon, and the intensity of such marks is proportional to the amplitude of applied energy.

A recording underwater echo ranging system of the aforementioned type useful as a fish finder is described in U.S. Patent 2,825,884 of Robert A. Fryklund entitled "Echo Ranging Devices," granted March 4, 1958, and assigned to the assignee of the present invention. A signal energy detector as disclosed in said patent, and further disclosed in greater detail in an application Serial No. 326,906, filed December 19, 1952, of said Robert A. Fryklund, now U.S. Patent 2,901,726 issued August 25, 1959, may be modified according to the present invention to provide improved resolution between the echo-signal returns from fish and those from the adjacent sea bottom.

As shown in FIG. 1, signal energy is applied to a grid-leak detector 10 which feeds a cathode follower 20, and the output of such cathode follower is applied to a display or indicator recording stylus 30 to produce marks on a record medium 32. Echo-signal returns from the sea bottom will normally produce a dark record mark or trace of high intensity on the record medium 32. Weaker signals returned by reflection from fish near the bottom produce a smaller area mark of low intensity. Such fish echo traces are often indistinguishable against the large area dark bottom record.

An improvement in the resolution between fish and bottom echoes can be realized if the fish echoes are recorded with a dark trace, while the stronger bottom echoes are recorded with a mark of much lighter intensity. In actual practice it has been found that when the fish echo was so close to the bottom that it actually merged with the bottom trace, it could still be readily recognized if recorded with a darker high intensity mark against a light bottom trace. Further, when the record medium 32 is of the type which is carbonized by signal energy in the recording stylus to produce a mark, an additional advantage will be realized in that there will be much less carbon dust from the large area bottom trace if it is recorded with a lighter low intensity mark. FIG. 2 shows a portion of a record medium 32 in which echo signals representing reflections from the bottom are shown as traces 35 and are recorded with a much lighter intensity than are the fish echo signal traces 36, the latter being recorded with a much darker high intensity to provide a good contrast with the lighter bottom trace.

In order to improve the recording resolution as described above, the use of a fast acting signal amplitude compressor circuit is suggested. The circuit should be over compensated so that a signal above a certain amplitude would actually be reduced in amplitude at the output of the compressor. As there is usually ten or more decibels difference in level between fish and bottom echo-signals, the compressor adjustment need not be too critical.

Known signal amplifier volume compression circuits could be adjusted to give usable results in a recording fish finder, but would require additional adjustment when the bottom echo-signal strength varied to a marked degree, as it does under many conditions of sea bottom. Thus, for signals due to reflections from the sea bottom a preferred compressor circuit is one which, for an input signal above a predetermined level, will reduce the output signal to a fixed level regardless of the variations of input signal amplitude above the predetermined level. A grid-controlled gas tube of the thyratron type may be used to give this preferred compressor action. The gas tube should be connected so that it will "fire" when the detected signal output reaches a selected level. This level should be at a point approximately 6 db above the strength of normal fish echoes, but less than the strength of the bottom echo signals.

In FIG. 1, a gas tube 25 is connected in a manner to reduce the output signal from cathode follower 20 when the gas tube is in a "fired" condition, as will be described more fully hereinafter.

Grid-leak signal detector 10 consists of the usual triode vacuum tube with input grid 11 and the parallel combination of grid resistor 12 and condenser 13 through which input signals are applied to the grid. Plate 14 of the detector is connected to a source of D.C. potential, which is indicated on the drawing as being +400 volts, through the series arrangement of resistors 15 and 16. The detector cathode 17 is connected directly to ground, and thus plate 14 is normally held at a reduced voltage level in the absence of input signals because the triode is operating without bias.

The amplified echo-signal, consisting of a pulse of R.F. energy, is applied to the input terminal and develops a negative voltage on grid 11, cutting off the detector triode 10 and driving plate 14 to the B+ level. Point "A" at the junction of resistors 15 and 16 will be normally about 12 volts less than the 400 volt B+ potential due to the values of resistors 15 and 16. Representative values for these resistors are 150,000 ohms and 5,100 ohms, respectively.

Output from detector 10 is taken from plate 14 thereof and is applied directly to grid 18 of cathode follower 20. Plate 19 of the cathode follower is connected to the 400 volt source of B+ potential, and cathode 21 is connected to ground by way of the cathode load resistor 22. This latter resistor develops the output signal which is applied to stylus 30.

A coupling condenser 23 connects input grid 24 of gas tube 25 to plate 14 of the detector 10. Thus positive pulses of signal energy from the output of detector 10 are applied to grid 24, and if of a sufficient amplitude to overcome the bias applied thereto by the combination of resistor 26, potentiometer 27 and the negative 150 volt source of bias potential, will cause gas tube 25 to "fire" or conduct.

When gas tube 25 conducts it presents a very low impedance path between the cathode 33 which is grounded, and the plate 28 which is connected to a point "A" through variable resistor 29. The voltage at point "A," when tube 25 conducts, will then be determined by the ratio between resistor 16 and resistor 29, neglecting the impedance of tube 25 and the high resistance value of resistor 15. This latter resistance can be neglected, since in the preferred embodiment it may have a value of 150,000 ohms as compared to a value of 50,000 ohms for each of resistor 29 and potentiometer 27.

By adjustment of variable resistor 29 the voltage at point "A," which is the effective supply voltage for the grid leak detector 10, can be adjusted to limit the output signal applied to stylus 30 to any desired level when gas tube 25 is in the "fired" condition.

It will be necessary to extinguish tube 25 to return it to a non-conducting condition at each keying cycle of the echo sounding equipment. Switch 34 performs this function by cyclically grounding point "B." Switch 34 may be actuated in any convenient manner, as by an auxiliary member on that part of the recorder mechanism which cyclically moves the stylus 30 past the record medium 32.

The bias level on grid 24 of the gas tube 25 can be adjusted by means of potentiometer 27 so that the tube will conduct on the stronger bottom echo-signals, but not on echo-signal returns from fish. It has been found that a B+ potential of 400 volts is advisable for the detector and cathode follower in order to achieve a sufficient dynamic range to handle echo-signals returned from varying types of sea bottom areas.

This completes the description of the preferred embodiment of the invention. However, many modifications thereof will be apparent to persons skilled in the art without departing from the spirit and scope of this invention. For example, various forms of echo-signal sounding devices may be used with the signal compressor of this invention. Also other forms of indicating or recording means may be used. For example, vessel records utilizing a cathode ray tube display could be used rather than the permanent record type of recorder disclosed herein. Accordingly, it is desired that this invention be not limited by the particular details of the species of the invention disclosed herein, except as defined by the appended claims.

What is claimed is:

1. A signal amplitude compressor comprising input means for receiving input signals, output means connected to said input means for producing output signals in response to said input signals, control means connected to said input means including means for reducing the gain of said input means, means for actuating said gain reduction means in response to input signals having an amplitude greater than a predetermined level, means for adjusting said gain reduction to provide output signals having amplitudes less than the amplitudes of those output signals produced in response to input signals having amplitudes less than said predetermined level, cyclically scanned indicating means fed by said output means, and means for returning said gain to its original value substantially at the beginning of each scan of said indicating means.

2. A signal amplitude compressor comprising input means for receiving input signals, output means connected to said input means for producing output signals in response to said input signals, control means connected to said input means including gas discharge means for reducing the gain of said input means, means for firing said gas discharge means in response to input signals having an amplitude greater than a predetermined level, means for adjusting the gain reduction to provide output signals having amplitudes less than the amplitudes of those output signals produced in response to input signals having amplitudes less than said predetermined level, cyclically scanned indicating means fed by said output means, and means for returning said gain to its original value substantially at the beginning of each scan of said indicating means.

3. Means to improve the resolution of an echo ranging system of the type wherein signal energy due to return echo signals is applied to a scanned display element comprising, a signal energy detector having an input circuit for receiving signals, an output circuit connected to said input circuit for producing output signals in response to said input signals, control means connected to said input circuit including means for reducing the gain of said input circuit, means for actuating said gain reduction means in response to input signals having an amplitude greater than a predetermined level, means for adjusting said gain reduction to provide output signals having amplitudes less than the amplitudes of output signals produced in response to input signals having amplitudes less than said predetermined level, and means for returning said gain to its original value substantially at the beginning of each scan of said scanned display element.

4. Means to improve the resolution of echo ranging systems used to detect objects in a body of water comprising, means for receiving echo signals reflected from objects within said body of water, scanning means connected to said receiver means for displaying said reflected echo signals, control means connected to said receiver means including means for reducing the gain of said receiver means, means for actuating said gain reduction means in response to echo signals having an amplitude greater than a predetermined level, means for adjusting said gain reduction to provide display signals having amplitudes less than the amplitudes of display signals produced in response to echo signals having amplitudes less than said predetermined level, and means for returning said gain to its original value substantially at the beginning of each scan of said scanning means.

References Cited in the file of this patent

UNITED STATES PATENTS

| | | |
|---|---|---|
| 2,276,708 | Wyckoff | Mar. 17, 1942 |
| 2,572,900 | Winkler | Oct. 30, 1951 |
| 2,596,510 | Roberts | May 13, 1952 |
| 2,869,109 | Fryklund | Jan. 13, 1959 |
| 2,977,585 | Cunningham | Mar. 28, 1961 |

FOREIGN PATENTS

| | | |
|---|---|---|
| 758,881 | Great Britain | Oct. 10, 1956 |